US008861711B2

(12) United States Patent
Takayama et al.

(10) Patent No.: US 8,861,711 B2
(45) Date of Patent: Oct. 14, 2014

(54) ECHO CANCELLATION APPARATUS, CONFERENCING SYSTEM USING THE SAME, AND ECHO CANCELLATION METHOD

(75) Inventors: Shinichi Takayama, Fukuoka (JP); Tsuyoki Nishikawa, Osaka (JP)

(73) Assignee: Panasonic Corporation, Osaka (JP)

( * ) Notice: Subject to any disclaimer, the term of this patent is extended or adjusted under 35 U.S.C. 154(b) by 165 days.

(21) Appl. No.: 13/544,514

(22) Filed: Jul. 9, 2012

(65) Prior Publication Data

US 2013/0016820 A1 Jan. 17, 2013

(30) Foreign Application Priority Data

Jul. 11, 2011 (JP) ................................. 2011-152529
Mar. 30, 2012 (JP) ................................. 2012-079156

(51) Int. Cl.
*H04M 9/08* (2006.01)
*H04B 15/00* (2006.01)
*H04B 3/23* (2006.01)

(52) U.S. Cl.
CPC ....................................... *H04B 3/23* (2013.01)
USPC ..................................... 379/406.01; 455/570

(58) Field of Classification Search
USPC ............ 379/202.01, 406.08, 406.01–406.16; 455/570; 381/66, 93, 94.1, 94.3; 370/282–286
See application file for complete search history.

(56) References Cited

U.S. PATENT DOCUMENTS

| 5,646,991 | A | * | 7/1997 | Sih | ............................ | 379/406.08 |
| 6,606,382 | B2 | * | 8/2003 | Gupta | ...................... | 379/406.05 |
| 7,925,004 | B2 | | 4/2011 | Hodges | | |
| 8,126,161 | B2 | * | 2/2012 | Togami et al. | ............... | 381/94.3 |
| 8,280,037 | B2 | * | 10/2012 | Takada | ..................... | 379/406.08 |
| 2005/0094795 | A1 | | 5/2005 | Rambo | | |
| 2008/0107281 | A1 | * | 5/2008 | Togami et al. | .................. | 381/66 |
| 2010/0208908 | A1 | * | 8/2010 | Hoshuyama | .................... | 381/66 |

FOREIGN PATENT DOCUMENTS

| JP | 2007-214976 | 8/2007 |
| WO | 2008/041878 | 4/2008 |

OTHER PUBLICATIONS

International Search Report dated Dec. 6, 2012.

\* cited by examiner

*Primary Examiner* — Rasha Al Aubaidi
(74) *Attorney, Agent, or Firm* — Seed IP Law Group PLLC

(57) ABSTRACT

An echo cancellation apparatus is connectable to a speaker configured to output speaker signals and a microphone configured to receive a sound from the speaker and including a plurality of microphone elements. The echo cancellation apparatus includes: a generating unit configured to generate a plurality of sensitivity signals having different sensitivity patterns which represent directionality of the microphone, based on a plurality of microphone signals obtained from the respective microphone signals; a delay estimating unit configured to determine a shortest delay time as an estimated delay time, the shortest delay time being a shortest one of delay times between the speaker signals and the microphone signals, the delay times being obtained from the respective sensitivity signals; and an echo suppressing unit configured to suppress echoes of the plurality of microphone signals using the estimated delay time.

15 Claims, 15 Drawing Sheets

FIG. 9A    FIG. 9B    FIG. 9C
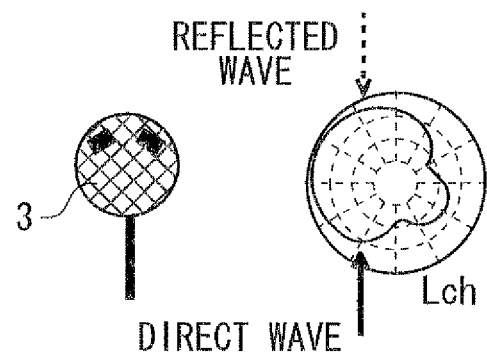 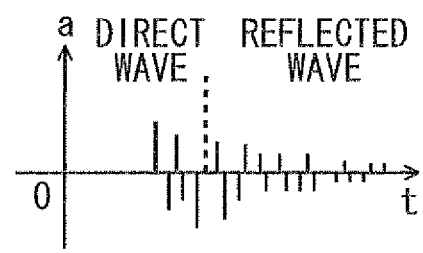

FIG. 10A    FIG. 10B    FIG. 10C
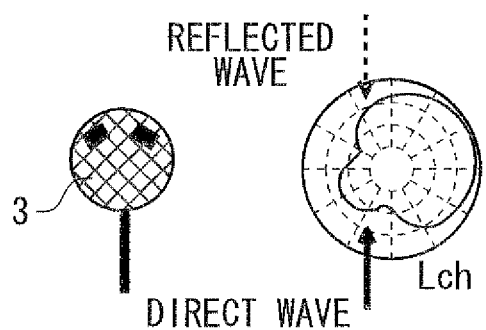
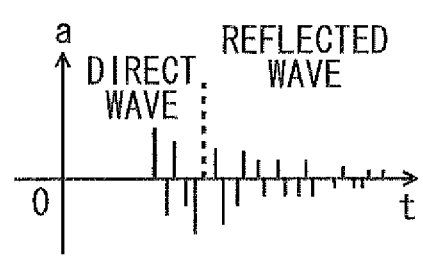

*FIG. 11A*   *FIG. 11B*   *FIG. 11C*
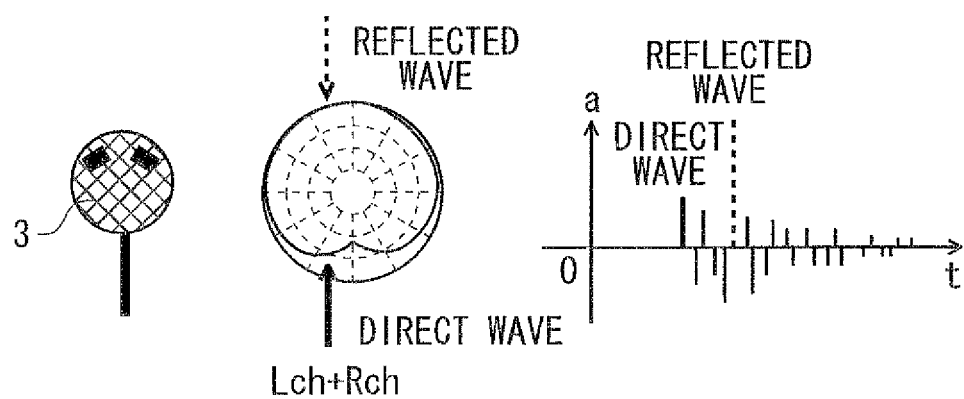

*FIG. 12A*  *FIG. 12B*  *FIG. 12C*
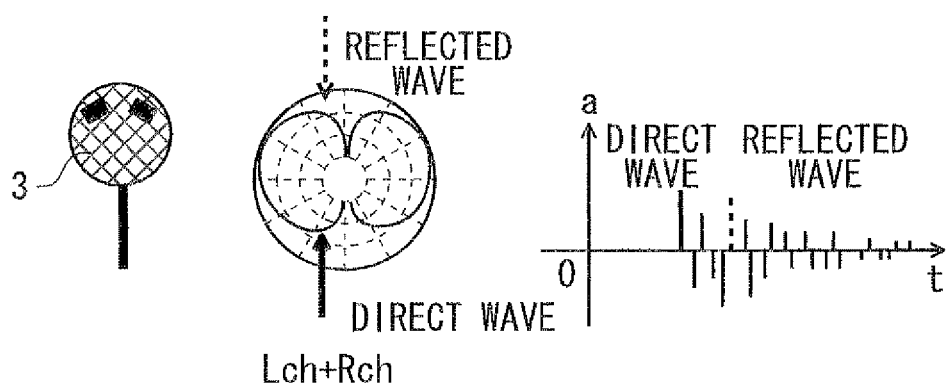

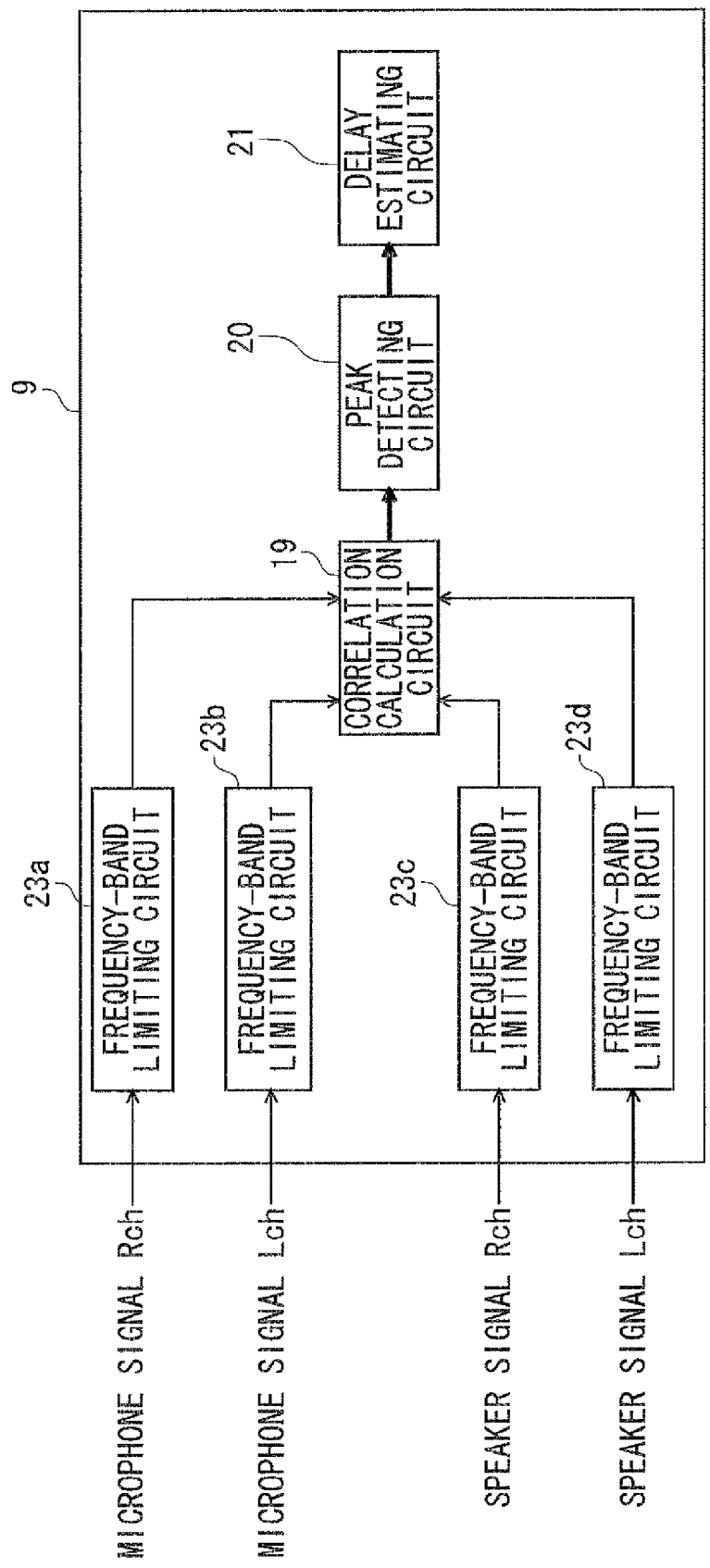

ECHO CANCELLATION APPARATUS, CONFERENCING SYSTEM USING THE SAME, AND ECHO CANCELLATION METHOD

BACKGROUND

1. Technical Field

The present invention relates to an echo cancellation apparatus for a teleconferencing system and the like, a conferencing system using the echo cancellation apparatus, and an echo cancellation method.

2. Background Art

Some of echo cancellation apparatuses have used for teleconferencing systems, in which the echo cancellation apparatuses are connected to TV sets and suppress acoustic echoes generated in a case where voices are output from the speakers of the TV sets, according to the delay times of the speakers of the TV sets (see JP-A-2007 214976).

SUMMARY

However, in the above-mentioned technology according to the related art, since the time it takes for a voice from a speaker of a TV set to reach a microphone of a teleconferencing system is used to calculate the delay time of the speaker of the TV set, it is impossible to accurately measure the delay time on the basis of the characteristic of the microphone, and thus it is impossible to suppress echoes.

In other words, in a case of using a directional microphone having high sensitivity on the talker side to prevent echoes from entering the microphone, since the sensitivity of the microphone on the speaker side is low, a sound from the speaker (a direct wave) becomes smaller than a sound such as a sound reflected off walls (a reflected wave) or the like, and thus it is difficult to sense the direct wave. For this reason, the reflected wave may be mistaken as the direct wave. In this case, even if delay time estimation is performed, it is difficult to measure the accurate delay time, and thus an echo process may not be appropriately performed.

For this reason, in view of the above-mentioned problems, the present invention is intended to provide an echo cancellation apparatus capable of reducing echoes regardless of the characteristic of a microphone, a conferencing system using the echo cancellation apparatus, and an echo cancellation method.

In an aspect, an echo cancellation apparatus connectable to a speaker configured to output speaker signals and a microphone configured to receive a sound from the speaker and including a plurality of microphone elements, the echo cancellation apparatus includes: a generating unit configured to generate a plurality of sensitivity signals having different sensitivity patterns which represent directionality of the microphone, based on a plurality of microphone signals obtained from the respective microphone signals; a delay estimating unit configured to determine a shortest delay time as an estimated delay time, the shortest delay time being a shortest one of delay times between the speaker signals and the microphone signals, the delay times being obtained from the respective sensitivity signals; and an echo suppressing unit configured to suppress echoes of the plurality of microphone signals using the estimated delay time.

With this configuration, it is possible to reduce echoes regardless of the characteristic of the microphone.

BRIEF DESCRIPTION OF THE DRAWINGS

FIGS. 9A to 9C are conceptual views illustrating a microphone of Lch.

FIGS. 10A to 10C are conceptual views illustrating a microphone of Rch.

FIGS. 11A to 11C are conceptual views illustrating a microphone of (Lch+Rch).

FIGS. 12A to 12C are conceptual views illustrating a microphone of (Lch−Rch).

FIG. 13 is a block diagram illustrating another delay control circuit.

DETAILED DESCRIPTION

An embodiment of the present invention will be described with reference to the accompanying drawings. In the present embodiment, a teleconferencing system will be described as an example. However, it is possible to appropriately use any systems, such as teleconferencing systems, which use speakers and microphones to perform echo cancellation.

Figure 1:
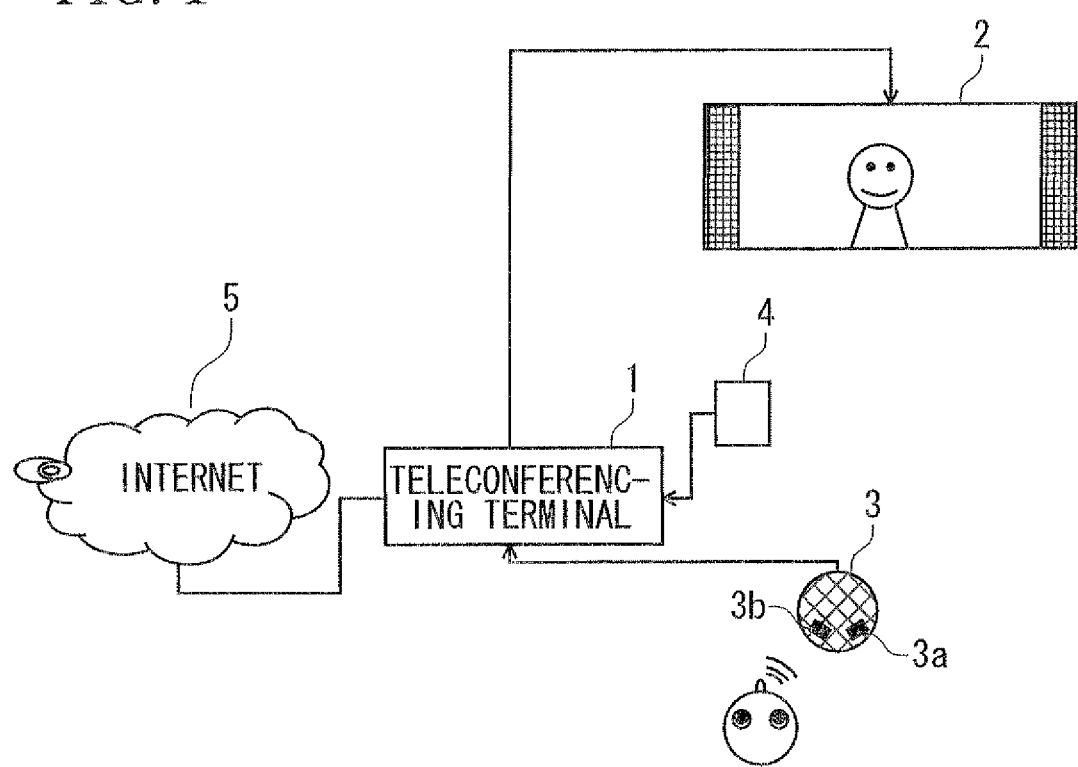
FIG. 1 is a conceptual view illustrating a teleconferencing system.

A configuration of a teleconferencing system will be described with reference to FIG. 1. FIG. 1 is a conceptual view illustrating a teleconferencing system.

In FIG. 1, in the teleconferencing system, a teleconferencing terminal 1 is connected to a TV set 2 for outputting images and voices, a microphone 3 for gathering the voice of a conference participant, and a camera 4 for acquiring images of the conference participant, and is connected to other teleconferencing terminals through the Internet 5.

As described below in detail, the teleconferencing terminal 1 acquires the images and voice of the conference participant from the microphone 3 and the camera 4, and transmits image signals and voice signals (microphone signals) to the other teleconferencing terminals through the Internet 5. Further, the teleconferencing terminal 1 receives image signals and voice signals (speaker signals) from the other teleconferencing terminals, and outputs the image signals and the voice signals to the TV set 2.

The TV set 2 is a general TV set, includes a display for displaying image signals transmitted from the teleconferencing system, a speaker (a stereo speaker in the present embodiment) for outputting voice signals (speaker signals) transmitted from the teleconferencing system, and so on, delays the speaker signals by a predetermined time (for example, 100 ms) so as to synchronize the speaker signals with the image signals, and outputs images and voices such that the images are sync with the voices at the TV set 2.

The microphone 3 includes a plurality of microphone elements. In the present embodiment, the microphone 3 is circular and includes two microphone elements disposed therein. The two microphone elements 3a and 3b are designed such that, with reference to the center of the microphone 3, the microphone element 3a and the microphone element 3b forms 120°, and a cable connection portion of the microphone 3 and each of the microphone elements 3a and 3b forms 120°.

In the present embodiment, the microphone elements 3a and 3b are directional microphones. In the whole microphone 3, the sensitivity is high on the side where the microphone elements 3a and 3b are disposed, and the sensitivity is low on the opposite side connected to a cable.

Figure 2:
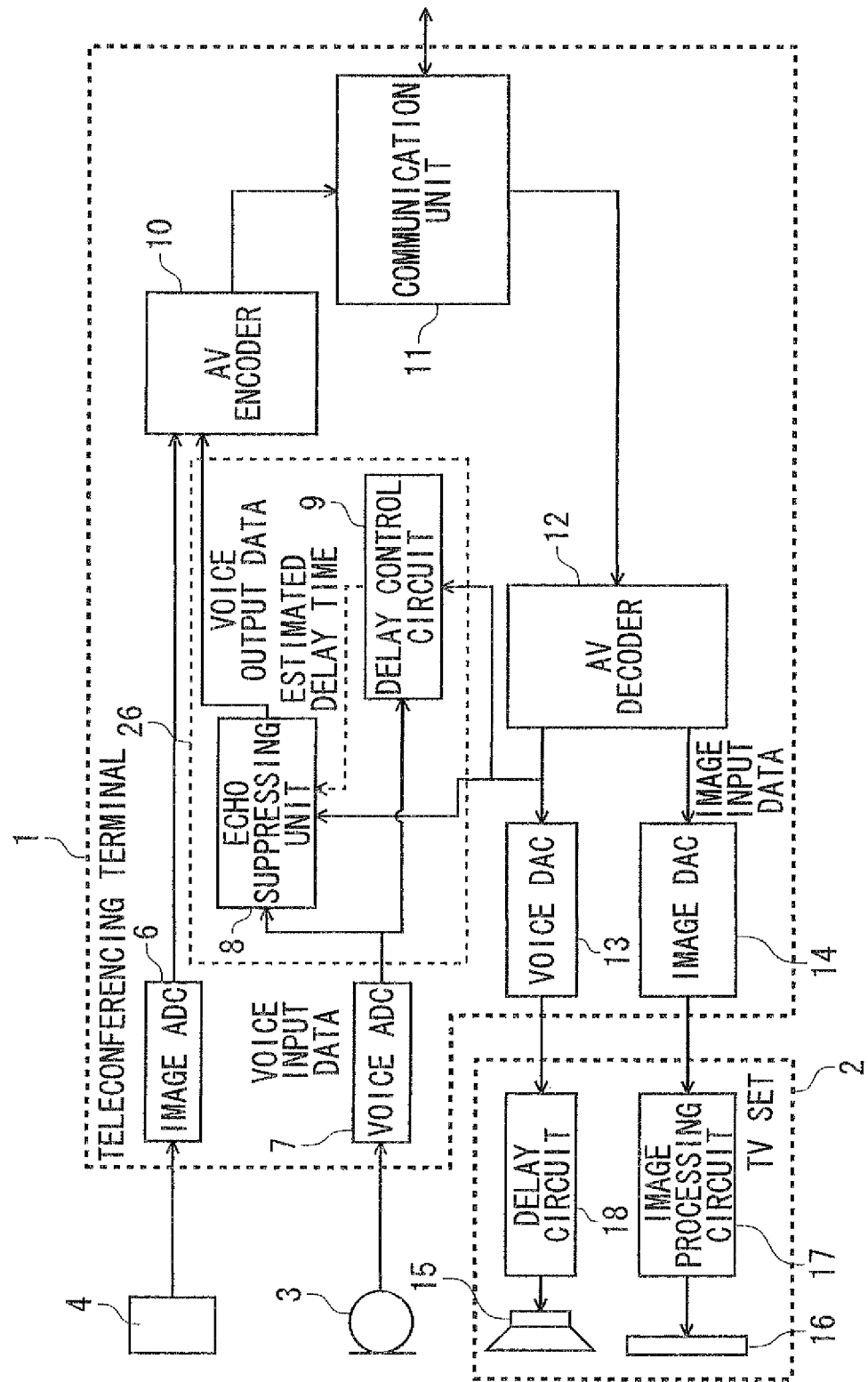
FIG. 2 is a block diagram illustrating the teleconferencing system.

The teleconferencing system shown in FIG. 1 will be described in detail with reference to FIG. 2. FIG. 2 is a block diagram illustrating the teleconferencing system. In FIG. 2, arrows show data transmission directions.

The teleconferencing terminal 1 includes an image ADC 6, a voice ADC 7, an echo cancellation apparatus 26, an AV encoder 10, a communication unit 11, an AV decoder 12, a voice DAC 13, and an image DAC 14. The image ADC 6 converts analog image signals from the camera 4 into digital image signals. The voice ADC 7 converts analog microphone signals from the microphone 3 into digital microphone signals. The echo cancellation apparatus 26 reduces (suppresses) acoustic echoes (hereinafter, referred to as echoes) of the microphone signals. The AV encoder 10 encodes the digital image signals output from the image ADC 6 and the microphone signals output from the echo cancellation apparatus 26. The communication unit 11 transmits encoded image and voice data to the other teleconferencing terminals, and receives image and voice data from the other teleconferencing terminals. The AV decoder 12 decodes the image and voice data received from the other teleconferencing terminals by the communication unit 11. The voice DAC 13 converts digital speaker signals from the AV decoder 12 into analog speaker signals. The image DAC 14 converts digital image signals from the AV decoder 12 into analog image signals.

Here, the echo cancellation apparatus 26 includes an echo suppressing unit 8 for estimating an acoustic characteristic between the speaker and the microphone and subtracting echoes from a microphone signal, and a delay control circuit 9 for estimating a delay time necessary for suppressing echoes.

In the present embodiment, the echo cancellation apparatus 26 is mounted on a voice DSP. However, the echo cancellation apparatus 26 may be implemented by a general-purpose CPU.

Also, in the present embodiment, the echo cancellation apparatus 26 is used to suppress echoes. However, an echo suppressor for attenuating target microphone signals linearly or non-linearly may be used to suppress echoes, or both of the echo cancellation apparatus 26 and an echo suppressor may be used.

Moreover, in the present embodiment, since the microphone 3 is a stereo microphone, the microphone 3 has microphone signals of two channels. However, in FIG. 2, for simplification, the microphone signals of two channels are shown like a microphone signal of one channel is shown.

The TV set 2 includes a speaker 15, a display 16, an image processing circuit 17 for receiving analog image signals from the teleconferencing terminal 1 and converting the analog image signals into display signals for performing display on the display 16, and a delay circuit 18 for delaying analog speaker signals from the teleconferencing system for synchronizing a voice and display images of the display 16.

The speaker 15 of the TV set 2 also is stereo and thus has speaker signals of two channels. However, in FIG. 2, for simplification, the speaker signals of two channels are shown like a microphone signal of one channel.

Also, since each of the TV set 2, the microphone 3, and the camera 4 receives and outputs analog signals, the image ADC 6, the voice ADC 7, the voice DAC 13, and the image DAC 14 are provided. However, if each of the TV set 2, the microphone 3, and the camera 4 receives and outputs digital signals, the image ADC 6, the voice ADC 7, the voice DAC 13, and the image DAC 14 are unnecessary.

Now the above-mentioned echoes will be described. In the teleconferencing system described above, a voice output from the speaker 15 of the TV set 2 is input to the microphone 3 directly or after being reflected off walls and the like. As a result, a sound input from the speaker 15 directly to the microphone 3 and sounds input to the microphone 3 after being reflected off the walls may cause echoes, which may decrease the voice quality.

For this reason, the above-mentioned echo cancellation apparatus 26 is used to suppress echoes of microphone signals from the microphone 3.

The operation of the teleconferencing system configured as described above will be described.

If a teleconference starts by the teleconferencing terminal 1 and the other teleconferencing terminals, images acquired by the camera 4 are transmitted as image signals to the AV encoder 10 through the image ADC 6. Similarly, a voice acquired by the microphone 3 is transmitted as microphone signals to the echo cancellation apparatus 26, which suppresses echoes and transmits the microphone signals to the AV encoder 10.

Further, image and voice data encoded by the AV encoder 10 are transmitted from the communication unit 11 to the other teleconferencing terminals through the Internet 5.

Also, image and voice data received from the other teleconferencing terminals by the communication unit 11 are decoded by the AV decoder 12, and image signals and speaker signals are output to the TV set 2 through the voice DAC 13 and the image DAC 14, respectively.

The image signals output from the teleconferencing terminal 1 are processed by the image processing circuit 17 for performing display on the display 16. At this time, in general, a delay of about 100 ms occurs. Therefore, even if the speaker signals output from the teleconferencing terminal 1 are intactly output from the speaker 15 of the TV set 2, a lag between the images and voice at the TV set 2 occurs in response to the image processing time of the image processing circuit 17. For this reason, a preliminary delay circuit 18 delays voice signals by the delay time occurring by the image processing circuit 17 and outputs the voice signals such that the lag between the images and voice at the TV set 2 is eliminated.

Figure 3:
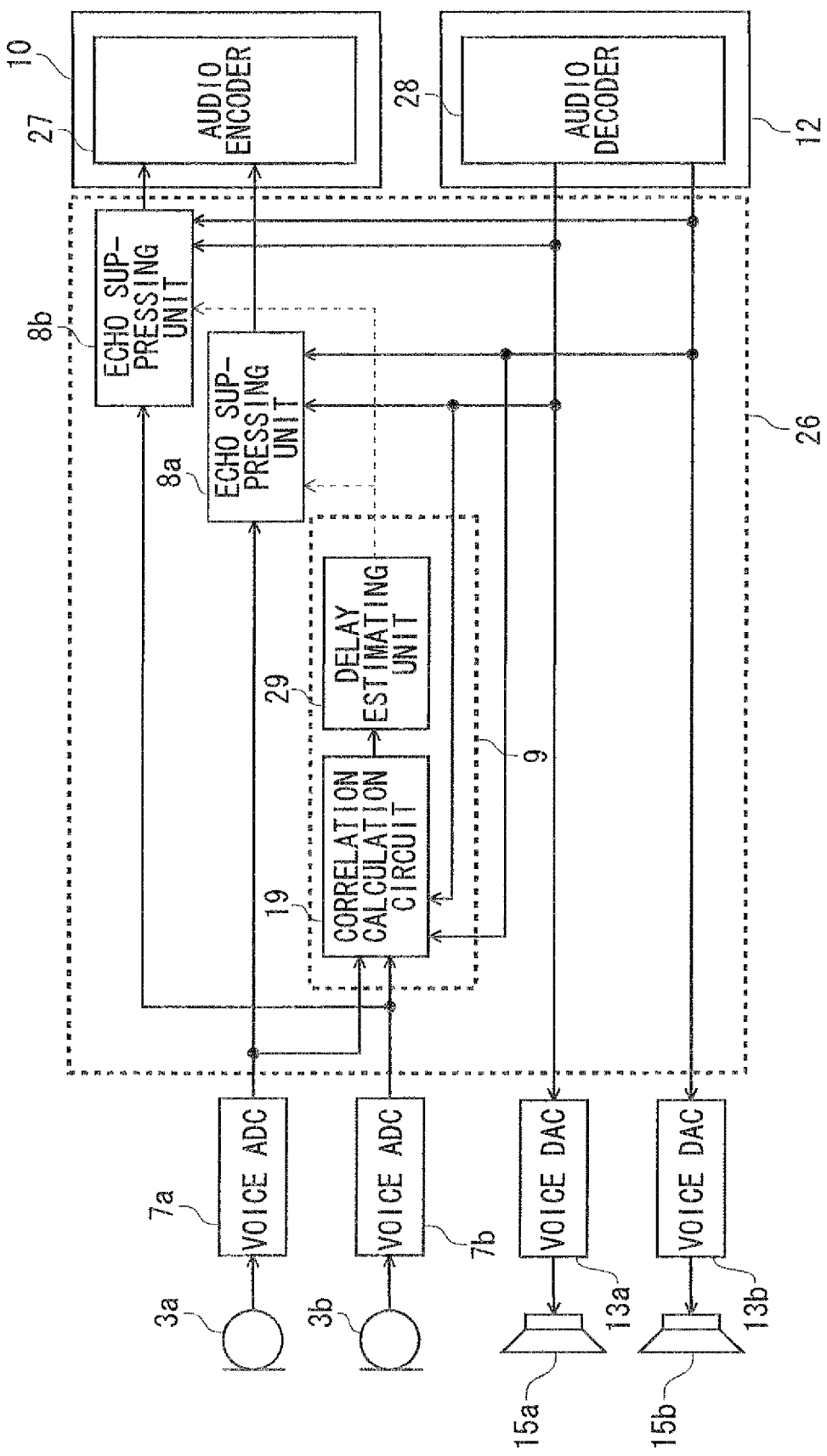
FIG. 3 is a block diagram illustrating an echo cancellation apparatus.

Now, an echo suppressing method in a case of using the teleconferencing terminal in the present embodiment will be described in detail with reference to FIG. 3.

In the present embodiment, since there are two voice channels, the microphone 3 includes microphone elements 3a and 3b and the speaker 15 includes a speaker 15a and a speaker 15b. Microphone signals acquired from the microphone elements 3a and 3b are transmitted to echo suppressing units 8a and 8b through voice ADCs 7a and 7b, respectively.

Next, the microphone signals are processed by the echo suppressing units 8a and 8b, are encoded by an audio encoder 27 of the AV encoder 10, and are transmitted to the other teleconferencing terminals.

Also, speaker signals transmitted from the other teleconferencing terminals are decoded by an audio decoder 28 of the AV decoder 12, and the decoded speaker signals are transmitted to each of the echo suppressing unit 8, the delay control circuit 9, and the speaker 15.

Here, the delay control circuit 9 includes a correlation calculation circuit 19 and a delay estimating unit 29. The correlation calculation circuit 19 generates a plurality of sensitivity signals (to be described below) on the basis of the microphone signal acquired from the microphone element 3a and the microphone signal acquired from the microphone element 3b, and calculates the correlation functions between the sensitivity signals and speaker signals. The delay estimating unit 29 obtains the delay time of the speaker signals in the TV set 2 on the basis of the correlation functions obtained by the correlation calculation circuit 19.

Next, the echo suppressing unit 8 delays the speaker signals by the delay time estimated by the delay estimating unit 29, estimates pseudo echo signals on the basis of the delayed speaker signals and the microphone signals by an internal adaptive filter of the echo suppressing unit 8, subtracts the pseudo echo signals from the microphone signals so as to suppress echo components of the microphone signals, and transmits the microphone signals with echoes suppressed to the audio encoder 27.

In the present embodiment, the delay time used in the echo suppressing unit 8 is the delay time of the microphone signals relative to the speaker signals. Further, in the echo suppressing unit 8, the speaker signals input to the echo suppressing unit 8 are used, and the microphone signals input to the echo suppressing unit 8 are used.

Therefore, the above-mentioned delay time includes a delay time occurring by the voice DAC 13, the delay circuit 18, the speaker 15, the microphone 3, and the voice ADC 7, and a delay time it takes for a voice output from the speaker 15 to reach the microphone 3.

Figure 4:
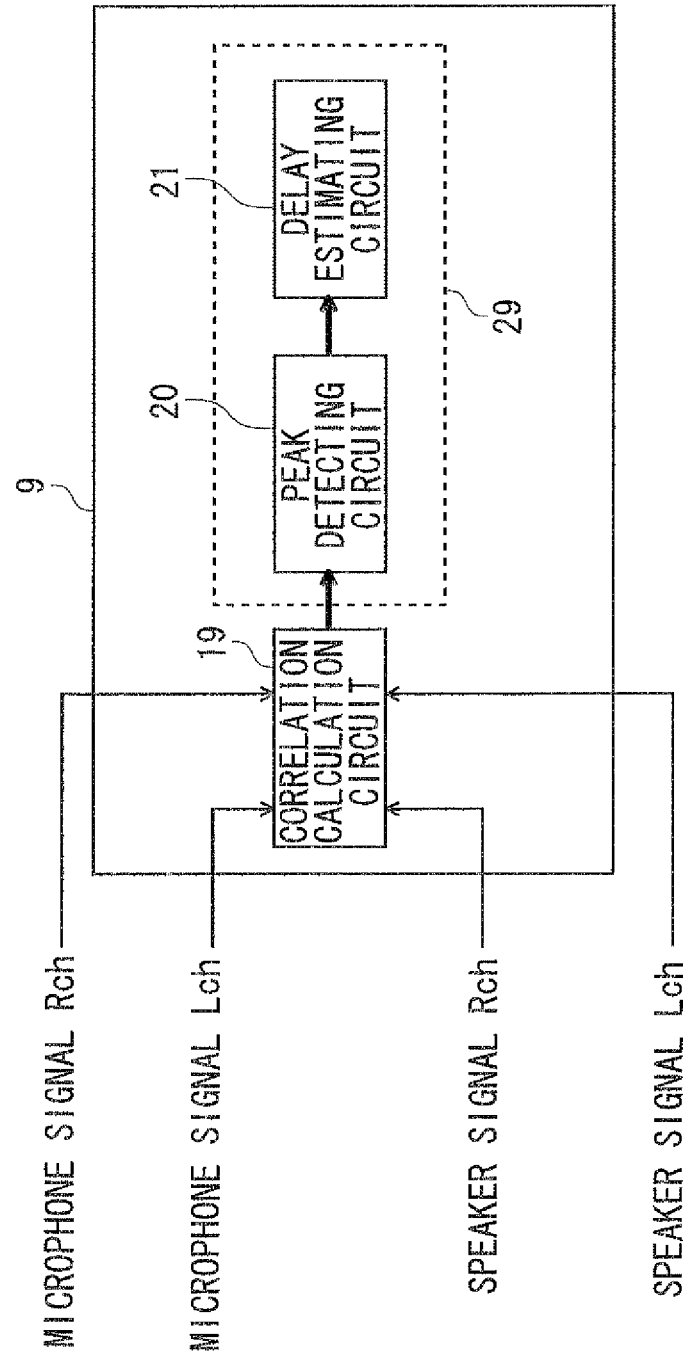
FIG. 4 is a block diagram illustrating a delay control circuit.

Now, the delay control circuit 9 for estimating (calculating) a delay time necessary for the above-mentioned echo process will be described in detail with reference to FIG. 4. FIG. 4 is a block diagram illustrating the delay control circuit.

In the present embodiment, since two microphone elements are used as described above, there are microphone signals of two channels. The microphone signal acquired from the microphone element 3a is referred to as a microphone signal Lch, and the microphone signal acquired from the microphone element 3b is referred to as a microphone signal Rch.

Also, since speaker signals of two channels are acquired from the other teleconferencing terminals, one speaker signal of them is referred to as a speaker signal Lch, and the other speaker signal is referred to as a speaker signal Rch.

In FIG. 4, the delay control circuit 9 includes the correlation calculation circuit 19 for outputting a plurality of correlation functions corresponding to microphone sensitivity signals on the basis of the microphone signals and the speaker signals, and the delay estimating unit 29 for estimating the delay time on the basis of the correlation functions.

The delay estimating unit 29 includes a peak detecting circuit 20 and a delay estimating circuit 21. The peak detecting circuit 20 detects a plurality of peaks corresponding to sharp increases in correlation value from the calculated correlation functions, and the delay estimating circuit 21 detects a peak corresponding to the smallest delay time from outputs of the peak detecting circuit 20, thereby determining the delay time between the microphone signals and the speaker signals.

Figure 5:
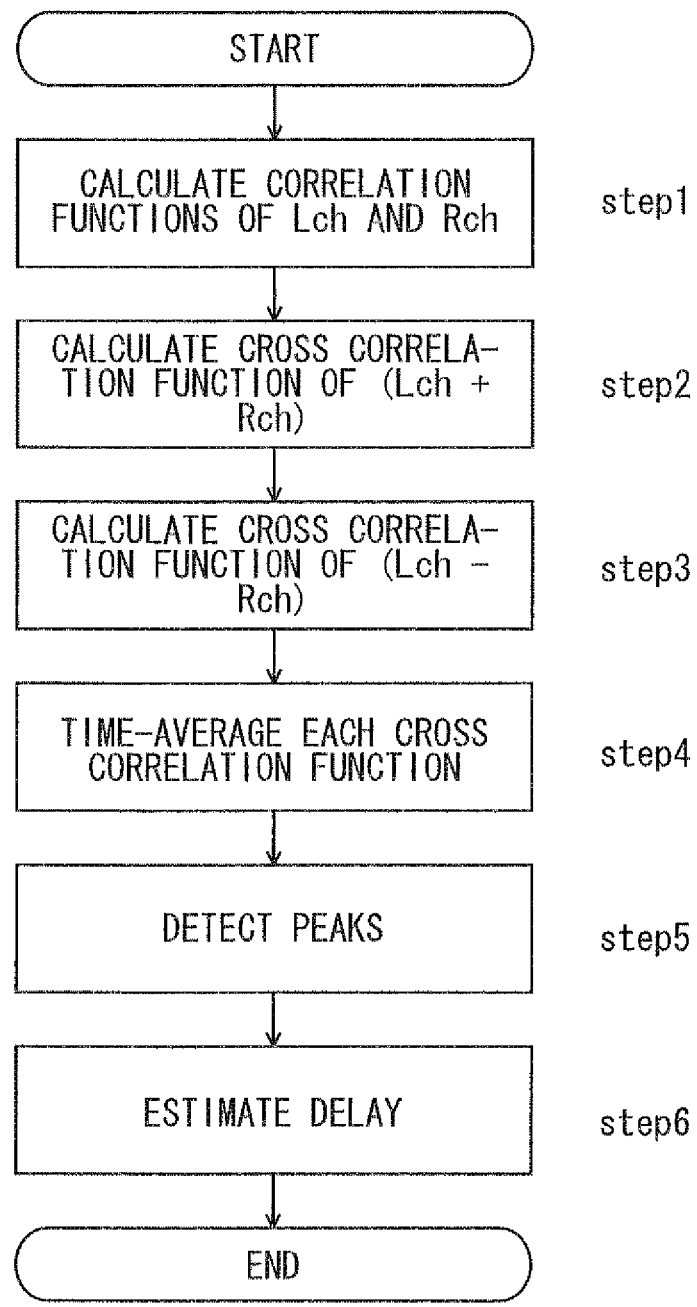
FIG. 5 is a flow chart illustrating the delay control circuit.

The operation of the delay control circuit 9 configured as described above will be described with reference to FIG. 5. FIG. 5 is a flow chart illustrating the delay control circuit.

First, in step 1, with respect to an input Lch microphone signal $m_L(t)$, an input Rch microphone signal $m_R(t)$, and the composite signal of Lch and Rch speaker signals, the delay control circuit 9 calculates correlation functions of Lch and Rch by the correlation calculation circuit 19.

Here, the above-mentioned correlation functions are calculated using Equations 1 and 2.

$$c_L(\tau) = \sum_t m_L(t) \cdot s(\tau - t) \quad \text{[Equation 1]}$$

$$c_R(\tau) = \sum_t m_R(t) \cdot s(\tau - t) \quad \text{[Equation 2]}$$

In the above-mentioned Equations, $\tau$ is a predetermined shift time of a corresponding speaker signal and corresponds to the time axis of each correlation function, t is a current time of the corresponding speaker signal and a corresponding microphone signal, $s(\tau-t)$ is a signal obtained by shifting the corresponding speaker signal by the predetermined shift time $\tau$, $c_L(\tau)$ is the correlation function of Lch, and $c_R(\tau)$ is the correlation function of Rch. Further, "$m_L(t) \cdot s(\tau-t)$" and "$m_R(t) \cdot s(\tau-t)$" are a product of $m_L(t)$ and $s(\tau-t)$ and a product of $m_R(t)$ and $s(\tau-t)$, respectively.

In step 2, the correlation calculation circuit 19 calculates the cross correlation function $c_{add}(\tau)$ of (Lch+Rch) on the basis of the correlation function $c_L(\tau)$ of Lch and the correlation function $c_R(\tau)$ of Rch. Similarly, in step 3, the correlation calculation circuit 19 calculates the cross correlation function $c_{diff}(\tau)$ of (Lch−Rch) on the basis of the correlation function $c_L(\tau)$ of Lch and the correlation function $c_R(\tau)$ of Rch.

The cross correlation function $c_{add}(\tau)$ of (Lch+Rch) and the cross correlation function $c_{diff}(\tau)$ of (Lch−Rch) are calculated using Equations 3 and 4.

$$c^{add}(\tau) = c_L(\tau) + c_R(\tau) \quad \text{[Equation 3]}$$

$$c_{diff}(\tau) = c_L(\tau) \quad \text{[Equation 4]}$$

Next, in step 4, the delay control circuit 9 time-averages each of the correlation function $c_L(\tau)$ of Lch, the correlation function $c_R(\tau)$ of Rch, the cross correlation function $c_{add}(\tau)$ of (Lch+Rch), and the cross correlation function $c_{diff}(\tau)$ of (Lch−Rch) so as to reduce instant peak changes of the four correlation functions, and outputs the time-averaged correlation functions to the peak detecting circuit 20.

In the present embodiment, in order to reduce instant peak changes, time-averaging is performed. However, the time-averaging may be omitted to simplify the echo process.

Next, in step 5, the peak detecting circuit 20 detects a plurality of peaks corresponding to sharp increases in correlation value from the time-averaged correlation functions.

Figure 6:
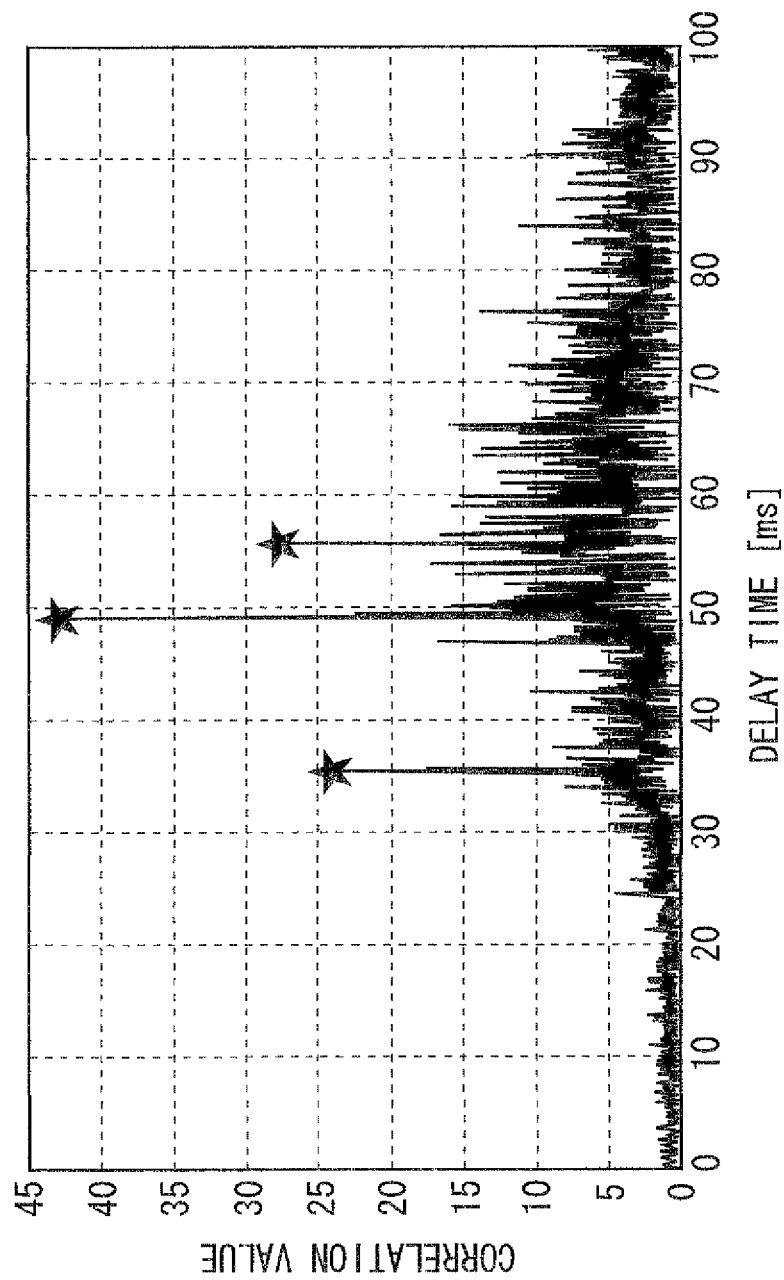
FIG. 6 is a conceptual view illustrating peaks of a correlation function.

Now, the peak detection will be described with reference to FIG. 6. FIG. 6 is a conceptual view illustrating peaks of a correlation function.

FIG. 6 shows a correlation function with correlation values on the vertical axis and a delay time on the horizontal axis. From this correlation function, peaks are detected.

The above-mentioned correlation functions correspond to sensitivity signals, and represent the correlation between the microphone signals and the speaker signals. The correlation function shown in FIG. 6 represents how much a microphone signal is correlated with a signal obtained by shifting a speaker signal by a predetermined time along a time axis (the degree of matching of the waveforms of both signals), and corresponds to Equation 1 or 2.

The detection of peaks of the correlation values of the correlation function is performed using the average and deviation of the entire correlation function, and a portion satisfying the condition of Equation 5 is determined as a peak.

$$c_{max} > \mu_c + \lambda_c \cdot v_c \qquad \text{[Equation 5]}$$

Here, $c_{max}$ is a portion which is a subject of the peak determination, $\mu_c$ is the average of the entire correlation function, $v_c$ is the deviation of the entire correlation function, and $\lambda_c$ is a parameter for adjusting a threshold value for peaks. If the parameter $\lambda_c$ is large, only sharp peaks are detected, and if the parameter $\lambda_c$ is small, it is easy to detect peaks. For this reason, the parameter $\lambda_c$ is appropriately set according to the purpose. In the present embodiment, the parameter $\lambda_c$ is set to 5 to 7.

According to the above-mentioned condition, in FIG. 6, three peaks marked with stars are detected.

After peaks of each of the correlation functions are detected, in step 6, the delay estimating circuit 21 estimates the shortest delay time of the delay times corresponding to the first peaks of the correlation functions, as the delay time of the speaker signals, on the basis of the detected peaks, subtracts a predetermined margin from the estimated delay time, and outputs the subtraction result as the delay time of the delay estimating circuit 21.

Now, the reason why the shortest delay time is estimated will be described. With respect to each of the correlation functions in the microphone 3, if peaks are detected, it is possible to obtain several delay time of the microphone signals. In this case, since the direct wave of the sound from the speaker 15 enters the microphone 3 earlier than the reflected waves of the sound from the speaker 15 reflected off walls and the like, the shortest delay time becomes the delay time of the direct wave.

Further, since the echo process is performed on a sound including a direct wave component, if it is possible to see the delay time of the direct wave, it is possible to effectively perform the echo process.

For these reasons, the delay time of the direct wave necessary for performing the echo process, that is, the shortest delay time is estimated.

Hereinafter, a method from the peak detection to the delay time estimation will be described with an example.

In the present embodiment, the peaks of the correlation functions of Lch, Rch, (Lch+Rch), and (Lch−Rch) are detected, the shortest delay times of the respective correlation functions are obtained, and the shortest delay time is selected from the delay times of Lch, Rch, (Lch+Rch), and (Lch−Rch).

For example, if the correlation function of Lch is the correlation function of FIG. 6, the delay times corresponding to the peaks are 36 ms, 49 ms, and 56 ms, and the delay time of Lch is estimated at 36 ms.

Also, a process similar to the above-mentioned process is performed on each of Rch, (Lch+Rch), and (Lch−Rch). In a case where the shortest delay times of Lch, Rch, (Lch+Rch), and (Lch−Rch) are 36 ms, 36 ms, 49 ms, and 36 ms, respectively, the delay estimating circuit 21 sets the delay time of the speaker signals to 36 ms on the basis of the results of the peak detection.

Here, the reason why only the delay time of (Lch+Rch) is long is as follows. As described below, in the disposition of the microphone 3 in the present embodiment, since the sensitivity of the microphone 3 is low with respect to the direct wave, the peak of the direct wave is not detected by the peak detecting circuit 20. Therefore, the first peak becomes the peak of a reflected wave, and the delay time corresponding to the peak of the reflected wave is estimated as the shortest delay time.

In the present embodiment, the peak detecting circuit 20 detects all peaks of one correlation function, and transmits all of the peaks to the delay estimating circuit 21. However, since the delay estimating circuit 21 needs only to see the shortest delay time of each correlation function, if the peak detecting circuit 20 detects the first peak, it may finish the peak detection, and transmit only the delay time corresponding to the detected peak to the delay estimating circuit 21.

Also, in the present embodiment, the four correlation functions are used to estimate the delay time of the direct wave. However, if two or more correlation functions are used, it is possible to estimate the delay time of the direct wave. As the number of used correlation functions increases, it is possible to more certainly sense the direct wave. For this reason, in the present embodiment, the four correlation functions are used to sense the direct wave.

Figure 7A:
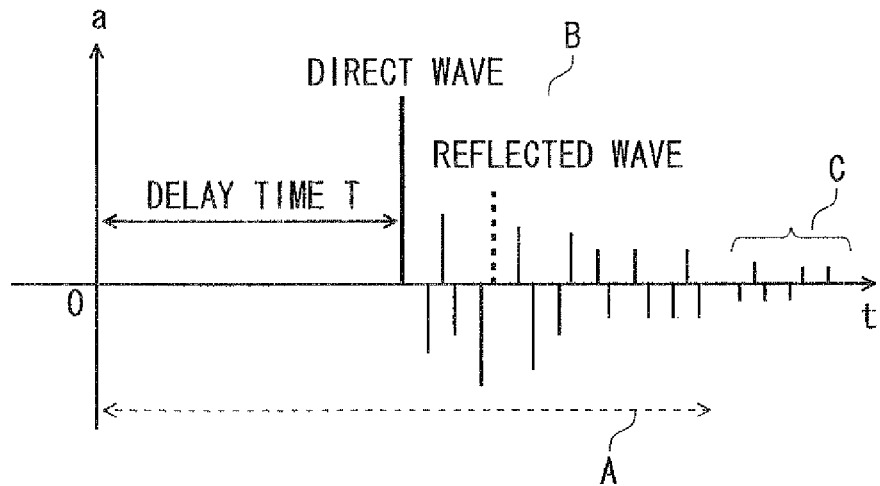
FIGS. 7A to 7C are conceptual views illustrating an echo process.
Figure 7B:
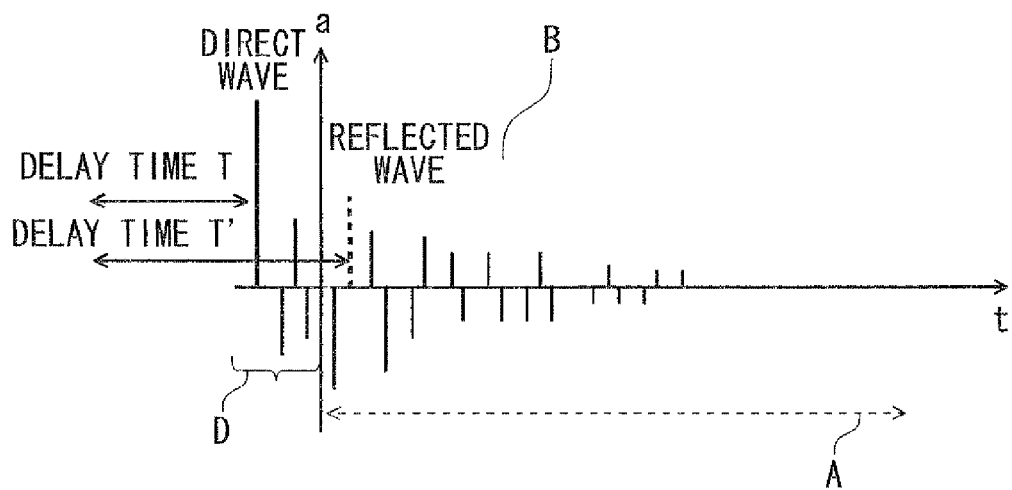
Figure 7C:
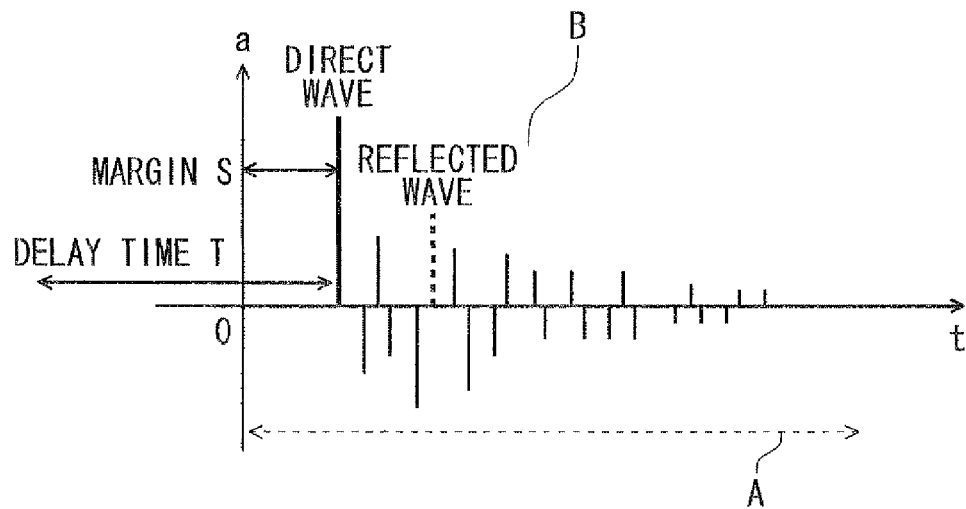

The reason why the delay time is determined as described above will be described with reference to FIGS. 7A to 7C. FIGS. 7A to 7C are conceptual views illustrating the echo process. More specifically, FIG. 7A represents a case where delay time control has not been performed, FIG. 7B represents a case where the delay time control has not been normally performed, and FIG. 7C represents a case where the delay time control has been normally performed. In each of FIGS. 7A to 7C, amplitudes 'a' are plotted on the vertical axis, and time 't' is plotted on the horizontal axis. In order to describe the delay time in a way easy to understand, FIGS. 7A to 7C show impulse responses corresponding to the acoustic characteristic between the speaker and the microphone.

In FIGS. 7A to 7C, a section 'A' represents a section in which echo estimation is possible, that is, a section in which it is possible to generate pseudo echoes on the basis of the speaker signals, thereby suppressing echoes, and the start time of the section in which the echo estimation is possible is taken as a reference (t=0).

Further, a reference symbol 'B' represents impulse responses corresponding to the acoustic characteristic between the speaker and the microphone, and the impulse responses include a direct wave reaching the microphone directly from the speaker, and reflected waves reaching the microphone after being reflected off walls and the like. In FIGS. 7A to 7C, thick lines represent direct waves, dotted lines represent reflected waves, and the other lines represent echo components generated by the direct waves and the reflected waves. Further, a delay time is denoted by T, and a margin is denoted by S.

As shown in FIG. 7A, if the delay time control is not performed, a section separate from the section. 'A' in which echo estimation is possible, that is, the latter part (a reference symbol 'C' in FIG. 7A) of the impulse responses of the microphone signals remains in a section in which it is impossible to suppress echoes. In the section 'C', it is impossible to suppress echoes, and thus it is impossible to appropriately perform the echo process.

For this reason, even if delay control is performed by the delay time obtained from the correlation functions, if a delay time of a reflected wave is mistaken as the delay time of the direct wave, in contrast to FIG. 7A, as shown in FIG. 7B, a direct wave part which is the earlier part (a reference symbol 'D' in FIG. 7B) of the impulse responses of the microphone signals is deviated from the section 'A' in which echo estimation is possible. Therefore, it is impossible to suppress an echo component in the direct wave part which has a greater effect than it does in FIG. 7A, and thus it is impossible to appropriately perform the echo process.

In other words, in the related art, the speaker signals are delayed by the delay time T of the direct wave such that the impulse responses B of the microphone signals enter the section 'A' in which the echo estimation is possible. However, a reflected wave is mistaken as the direct wave and thus the speaker signals are delayed by a delay time T' of the reflected wave as shown in FIG. 7B. Therefore, it is impossible to perform an appropriate echo process.

For this reason, the above-mentioned delay-time estimating method is used to certainly measure the delay time of the direct wave, such that, in the echo process, the impulse responses of the microphone signal enter the section 'A' in which the echo estimation is possible, as shown in FIG. 7C.

In this case, a predetermined margin S is provided to prevent the direct wave from being deviated from the section 'A' in which the echo estimation is possible, as shown in FIG. 7B, due to an error in the delay time estimation, or due to a reduction in the delay time, for example, in a case where the microphone 3 gets a little closer to the speaker side, and to certainly suppress an echo component (direct wave) having a great effect.

Also, in the present embodiment, in a case where the predetermined margin S is 20 ms, in the above-mentioned example, 20 ms is subtracted from the selected delay time of 36 ms, and thus the delay control circuit 9 finally outputs 16 ms as the delay time.

In a case where the delay time is larger than the predetermined margin S, the delay time is calculated as described above. However, in a case where the delay time is smaller than the predetermined margin, the delay time is intactly output as the delay time of the delay control circuit 9 (the predetermined margin is not subtracted from the delay time).

In a case where the delay control circuit 9 recalculates the delay time at a predetermined timing, if a difference between the recalculated delay time and the estimated current delay time (which is used in the echo suppressing unit 8) is smaller than a predetermined time (10 ms in the present embodiment), the delay time to be output by the delay control circuit 9 is not changed.

Therefore, if the delay time is reset and the echo process is performed while maintaining the performance of the echo process, it is possible to reduce temporary echoes.

Figure 8:
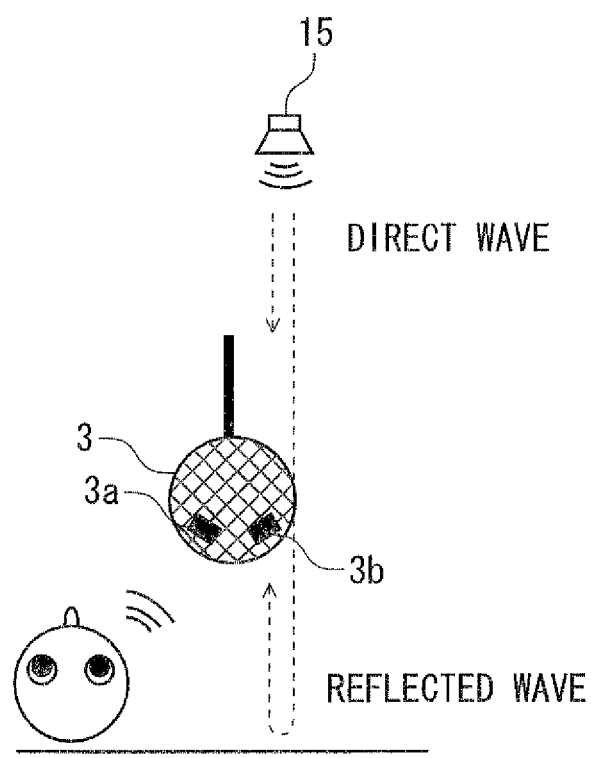
FIG. 8 is a conceptual view illustrating the vicinity of a microphone.

Now, the reasons why a plurality of correlation functions is used to obtain the delay time as described above will be described in detail with reference to FIGS. 8 to 12C. FIG. 8 is a conceptual view illustrating an acoustic wave in the vicinity of the microphone, FIGS. 9A to 9C are conceptual views illustrating the microphone of Lch, FIGS. 10A to 10C are conceptual views illustrating the microphone of Rch, FIGS. 11A to 11C are conceptual views illustrating the microphone of (Lch+Rch), and FIGS. 12A to 12C are conceptual views illustrating the microphone of (Lch−Rch).

In the microphone 3 of the present embodiment, the microphone elements 3a and 3b are disposed as described above. In a sensitivity pattern (Lch+Rch) formed by the two microphone elements 3a and 3b, the sensibility of the front side of the microphone 3 (the opposite portion to the portion connected to the cable of the microphone 3) is higher than the sensitivity of the rear side of the microphone 3 (the portion connected to the cable of the microphone 3).

The microphone 3 configured as described above is generally disposed as shown in FIG. 8 such that the highly sensitive portion is disposed on the talker side, and the lowly sensitive portion is disposed on the speaker (15) side. According to this disposition, the voice of the talker is certainly gathered, and the sound of the speaker 15 enters the microphone as little as possible.

In this case, in the above-mentioned sensitivity pattern (Lch+Rch), since the direct wave reaches the lowly sensitive portion of the microphone 3, the power (amplitude) of the direct wave as the microphone signal is reduced. In contrast, since the reflected waves reflected off the walls reaches the highly sensitive portion of the microphone 3, the powers of the reflected waves becomes higher than that of the direct wave.

For this reason, in a case of estimating the delay time using only the above-mentioned sensitivity pattern (Lch+Rch), the peak of the direct wave may be smaller than the peaks of the reflected waves. In this case, it is impossible to detect the peak of the direct wave, and thus the delay time of the peak of a reflected wave is determined as the delay time of the correlation function of (Lch+Rch).

In this case, actually, a delay time longer than the delay time of the speaker signals occurring until the speaker signals reach the microphone is estimated, and thus it is impossible to suppress echoes based on the direct wave in the microphone signal as shown in FIG. 7B.

For this reason, in the present embodiment, the two microphone elements are combined such that a plurality of sensitivity patterns (correlation functions) is made. Therefore, even if the delay time of the reflected wave of the delay times obtained according to one correlation function in the delay time estimation is mistaken as the delay time of the direct wave, it is possible to certainly obtain the delay time of the direct wave on the basis of the delay times obtained according to another correlation function.

Hereinafter, an example of a plurality of sensitivity patterns will be described.

FIGS. 9A to 9C show a microphone signal of Lch formed only by the output of the microphone element 3a, and FIG. 9B shows a sensitivity pattern which is formed by the microphone signal of Lch in a case where the microphone is disposed as shown in FIG. 9A and in which an outer line in the radial direction in a circle represents higher sensitivity. FIG. 9C shows impulse responses of the microphone signal of Lch received in the case of FIG. 9B.

In FIG. 9C, a direct wave is shown by a thick line, and a reflected wave is shown by a broken line. Those lines show the beginnings of the direct wave and the reflected wave, and do not limit the direct wave and the reflected wave.

Similarly to FIGS. 9A to 9C, FIGS. 10A to 12C show microphone signals. FIGS. 9A to 9C show the microphone signal of Lch, whereas FIGS. 10A to 10C show a microphone signal of Rch, FIGS. 11A to 11C show a microphone signal of (Lch+Rch), and FIGS. 12A to 12C show a microphone signal of (Lch−Rch).

Referring to FIGS. 9A to 12C, if the two microphone elements are combined, it is possible to form a plurality of sensitivity patterns. Further, it is possible to sense peaks in the sensitivity pattern of the microphone signal of (Lch+Rch) in which the reflected wave is sufficiently larger than the direct wave, to estimate the direct wave, and to estimate the delay time. Therefore, on the basis of any sensitivity pattern, it is possible to certainly obtain the delay time of the direct wave and it is possible to certainly estimate the delay time using the echo process.

The plurality of sensitivity patterns of the microphone signal can be formed by combining the microphone signals of Lch and Rch described above. In order to obtain the delay time of the direct wave in each sensitivity pattern, the correlation function of Lch and Rch is used. The relational expression becomes Equation 6, where c(τ) is a cross correlation function corresponding to the sensitivity pattern after the combination, $c_L(τ)$ and $c_R(τ)$ are correlation functions corresponding to the sensitivity patterns of Lch and Rch, and $k_L$ and $k_R$ are arbitrary real numbers. Further, as the four correlation functions used in the present embodiment, there are used the correlation function of Lch obtained in a case where $k_R$ is 0, the correlation function of Rch obtained in a case where $k_L$ is 0, the correlation function of (Lch+Rch) obtained as Equation 3 in a case where $k_L$ is 1 and $k_R$ is 1, and the correlation function of (Lch−Rch) obtained as Equation 4 in a case where $k_L$ is 1 and $k_R$ is −1.

$$c(τ)=k_L·c_L(τ)+k_R·c_R(τ) \quad \text{[Equation 6]}$$

Equation 6 represents in a case where the number of microphone elements is two. In a case where the number of microphone elements is n, a correlation function c'(τ) can be obtained as Equation 7. In Equation 7, k is an arbitrary real number, and c(τ) represents each correlation function.

$$c'(τ)=k_1·c_1(τ)+k_2·c_2(τ)+k_3·c_3(τ)+ \ldots +k_n·c_n(τ) \quad \text{[Equation 7]}$$

In other words, the plurality of sensitivity patterns includes not only sensitivity patterns corresponding to originally obtained microphone signals such as Lch and Rch but also two sensitivity patterns formed by combining the microphone signals of Lch and Rch.

In the present embodiment, the delay time until the voice from the speaker 15 reaches the microphone 3 is estimated as described above; however, it can be estimated as follows such that the amount of calculation is further reduced. Hereinafter, three examples of a configuration for reducing the amount of calculation will be described.

As the first one, there is a method of replacing the delay control circuit 9 with one shown in FIG. 13. FIG. 13 is a block diagram illustrating the delay control circuit.

Specifically, the frequency bands of the microphone signals and the speaker signals is limited, and the correlation functions are calculated. In FIG. 13, the delay control circuit 9 includes frequency-band limiting circuits 23a, 23b, 23c, and 23d for limiting the frequency bands of the microphone signals and the speaker signals, a correlation calculation circuit 19 for outputting the correlation functions using the microphone signals and the speaker signals having the limited frequency bands, a peak detecting circuit 20 for detecting the peaks of the calculated correlation functions, and a delay estimating circuit 21 for determining the delay time using the peaks detected from the plurality of correlation functions.

Each frequency-band limiting circuit receives a corresponding microphone signal or speaker signal, and performs band-limiting using a band-limiting filter such as an FIR filter or an HR filter. All of the limited frequency bands of the frequency-band limiting circuits for limiting the frequency bands of the microphone signals and the speaker signals need to be the same. In the above-mentioned example, in the method which does not limit the bands, a frequency band of 0 kHz to 12 kHz is used to calculate the correlation functions. However, in FIG. 13, high-pass filters for transmitting a band equal to or high than 6 kHz are used to perform the band-limiting, and then the correlation functions are calculated.

If the frequency bands are limited as described above, since it is possible to perform down-sampling, an amount of data to be calculated is reduced. Therefore, it is possible to reduce the amount of calculation as compared to the case of calculating the correlation functions using the entire bands. As shown by Equations 1 and 2, since the calculation of the correlation functions is convolution calculation of the microphone signals and the speaker signals, the amount of calculation of the correlation functions per a unit of time increases in proportion to the square of a sampling frequency.

For this reason, if the band-limiting is performed and down-sampling is performed by K, it is possible to reduce the amount of calculation of the cross correlation functions per a unit of time to $1/K^2$. In the present embodiment, since the down-sampling is performed such that the sampling frequency of 12 kHz is reduced in half, that is, to 6 Hz, the amount of calculation of the cross correlation functions becomes ¼ of that in the case of performing the calculation using the entire band.

The microphone signals and the speaker signals down-sampled according to the band-limiting are input to the correlation calculation circuit 19, and delay time estimation is performed in the same procedure as that shown in FIG. 5.

Also, a low-pass filter or a high-pass filter may be used to perform band-limiting to an arbitrary band. However, since a high-frequency signal is unlikely to be influenced by reflection, if a high-pass filter is used, a direct sound is more easily estimated.

Figure 14:
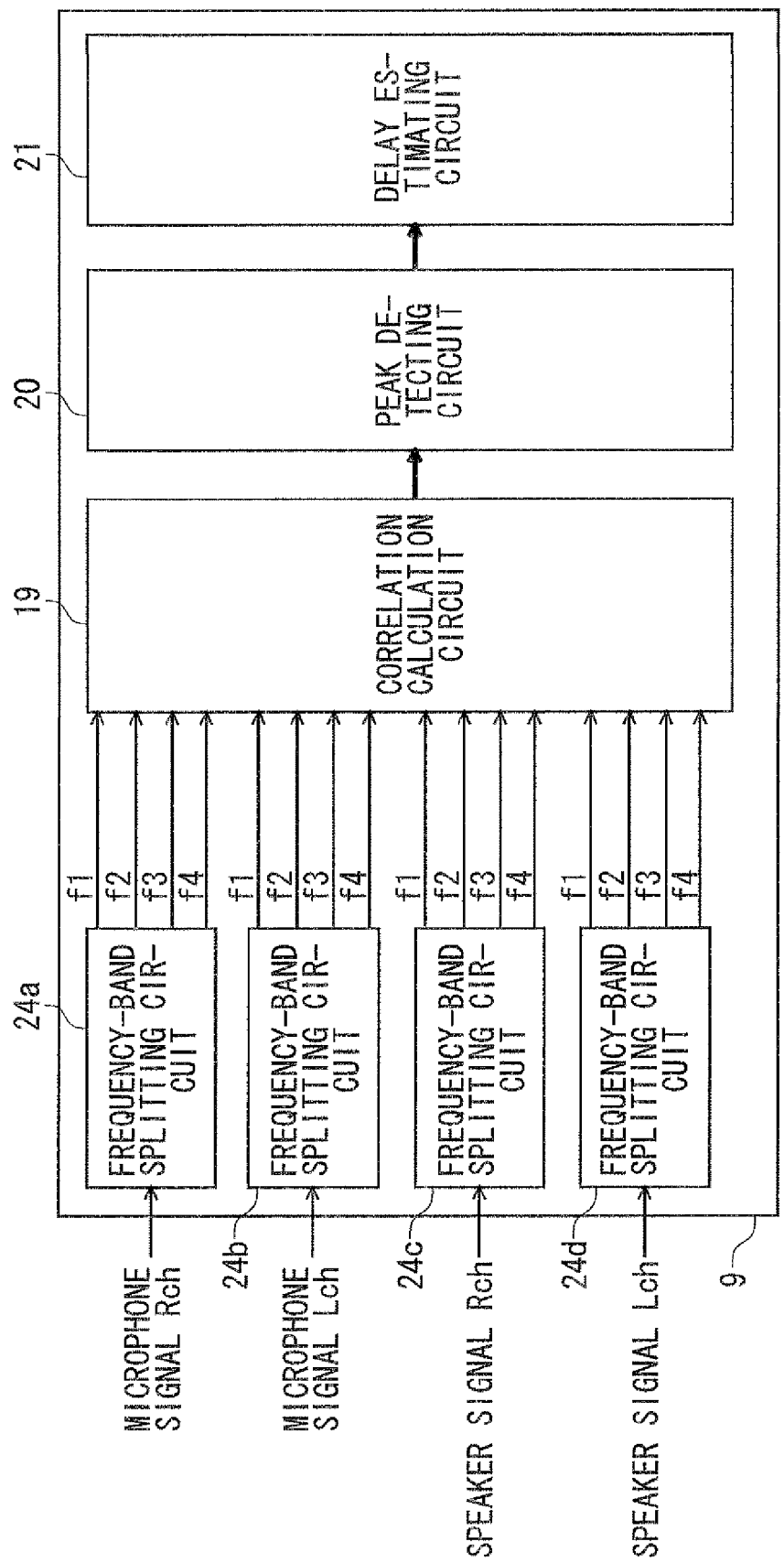
FIG. 14 is a block diagram illustrating another delay control circuit.

As the second one, there is a method of replacing the delay control circuit 9 with one shown in FIG. 14. FIG. 14 is a block diagram illustrating the delay control circuit.

Specifically, the microphone signals and the speaker signals are split into a plurality of frequency bands, a delay time is estimated for each frequency band, and the shortest delay time is selected from the plurality of delay times. In FIG. 14, the delay control circuit 9 includes frequency-band splitting circuits 24a, 24b, 24c, and 24d for splitting the microphone signals and the speaker signals into the frequency bands and performing down-sampling, a correlation calculation circuit 19 for calculating correlation functions for each frequency band, using the microphone signals and the speaker signals in the corresponding frequency band, a peak detecting circuit 20 for detecting the peaks of the correlation functions calculated for each frequency band, and a delay estimating circuit 21 for calculate the shortest delay time of the delay times obtained for the frequency bands, thereby determining the delay time between the speaker and the microphone.

Each frequency-band splitting circuit receives a corresponding microphone signal or speaker signal, and splits the corresponding signal into K-number of frequency bands. For each of the frequency bands, down-sampling is performed by the factor K. For each frequency band, delay time estimation is performed in the same procedure as that shown in FIG. 5. The delay times of the respective frequency band are input to the delay estimating circuit 21, and the shortest delay time is determined as the delay time between the microphone signals and the speaker signals.

For example, in the present embodiment, the number of the frequency bands is set to 4, the frequency ranges of the frequency bands f1, f2, f3, and f4 are set to 0 kHz to 3 kHz, 3 kHz to 6 kHz, 6 kHz to 9 kHz, and 9 kHz to 12 kHz, respectively, and the correlation functions are calculated for each frequency band. In a case where the estimated values of the delay times for the frequency bands f1, f2, f3, and f4 are 50 ms, 50 ms, 30 ms, and 40 ms, respectively, the shortest estimated delay time becomes 30 ms.

In the above-mentioned method, it is possible to estimate the delay times for all of the frequency bands. However, in a case where there is a frequency band in which delay time estimation is impossible, for only frequency bands in which delay time estimation is possible, correlation function calculation may be performed for performing the delay time estimation.

As described above, since the correlation function calculation is convolution calculation of the microphone signals and the speaker signals, the amount of correlation function calculation per a unit of time increases in proportion to the square of the sampling frequency.

For this reason, if a process band is split into K-number of frequency bands, and the down-sampling is performed by K, the amount of calculation of cross correlation functions per a unit of time for each frequency band becomes $1/K^2$. Therefore, the amount of calculation for the entire band which is the sum of K-number of bands becomes $1/K$, and thus it is possible to reduce the amount of calculation as compared to the case of calculating the correlation functions using the entire band. In the present embodiment, since the frequency band of 12 kHz is split into four bands, the amount of correlation function calculation becomes ¼ of that in the case of performing the calculation using the entire band.

Figure 15:
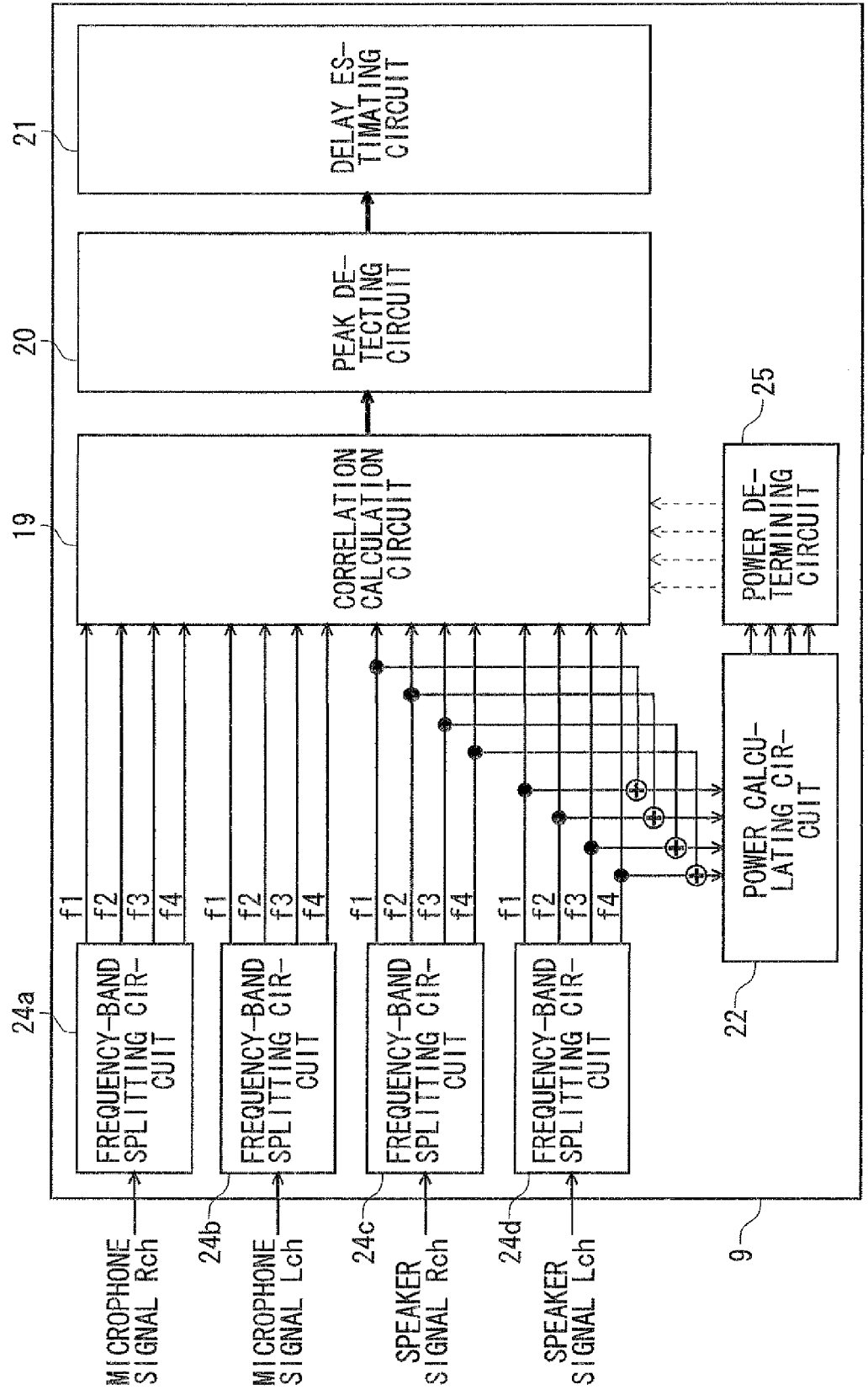
FIG. 15 is a block diagram illustrating another delay control circuit.

As the third one, there is a method of replacing the delay control circuit 9 with one shown in FIG. 15. FIG. 15 is a block diagram illustrating the delay control circuit.

Specifically, there is a method of splitting the microphone signals and the speaker signals into a plurality of frequency bands, calculating the power of the speaker signals for each frequency band, and estimating the delay time using only the frequency band in which the powers are large. In FIG. 15, the delay control circuit 9 includes frequency-band splitting circuits 24a, 24b, 24c, and 24d for splitting the microphone signals and the speaker signals into a plurality of frequency bands and performing down-sampling, a power calculating circuit 22 for calculating the power of the speaker signals for each frequency band, a power determining circuit 25 for determining frequency bands to be used for correlation function calculation, on the basis of the powers of the speaker signals, a correlation calculation circuit 19 for calculating correlation functions using the microphone signals and the speaker signals for each of the determined frequency bands, a peak detecting circuit 20 for detecting the peaks of each of the calculated correlation functions, and a delay estimating circuit 21 for calculating the shortest delay time of the delay times obtained for the determined frequency bands, thereby determining the delay time between the speaker and the microphone.

Each frequency-band splitting circuit receives a corresponding microphone signal or speaker signal, and splits the corresponding signal into K-number of frequency bands. For each of the frequency bands, down-sampling is performed by the factor K. The split speaker signals are mixed for each frequency band, and each mixed signal is input to the power calculating circuit 22, and the power of the speaker signals for each frequency band is calculated. The powers calculated for the respective frequency band are input to the power determining circuit 25, and frequency bands to be used for delay estimation are determined on the basis of a determination condition. The correlation calculation circuit 19 calculates correlation functions for the frequency bands determined by the power determining circuit, and performs delay time estimation in the same procedure as that shown in FIG. 5. The estimated delay times are input to the delay estimating circuit 21, and the smallest delay time of the plurality of delay times are determined as the delay time between the microphone signals and the speaker signals.

In the present embodiment, from among the four frequency bands, the top two frequency bands having higher powers are used to calculate the correlation functions and estimate the delay time.

As described above, in the case where the process band is divided into K-number of frequency bands, and the down-sampling is performed by K, the amount of correlation function calculation becomes ¼. In the present embodiment, since the frequency band of 12 kHz is divided into four frequency bands, and half of the four frequency bands, that is, two frequency bands are used to calculate the correlation functions, the amount of calculation of cross correlation functions becomes ⅛ of that in the case of performing the calculation using the entire band.

Also, since the microphone signals and the speaker signals band-limited by the frequency-band limiting circuits 23 or the frequency-band splitting circuits 24 are used only for delay time estimation, they have no influence on the quality of the voice transmitted to other places.

As described above, according to the present embodiment, since the plurality of sensitivity patterns is used to calculate the delay time, it is possible to certainly estimate the delay time until the voice from the speaker 15 reaches the microphone 3, and it is possible to stably perform the echo process regardless of the characteristic of the microphone.

In other words, since the delay time of the direct wave is obtained according to the plurality of sensitivity patterns, even if a reflected wave is mistaken as the direct wave by one sensitivity pattern, the delay time in another sensitivity pattern is estimated as the delay time until the voice from the speaker 15 reaches the microphone 3. Therefore, it is possible to use the microphone with no regard for its directionality, and it is possible to stably perform the echo process.

Also, in a case whether there are a number of microphone elements, and it is possible to certainly sense the direct wave by any microphone element, it is possible to perform delay time estimation without generating a new sensitivity pattern.

In general, the teleconferencing terminal 1 cannot recognize whether the currently used microphone is non-directional or directional. However, according to the present embodiment, it is possible to perform a teleconference with no regard for the directionality of the microphone.

Further, even in a situation where it is difficult to detect the direct wave due to the gains of the microphone elements, if Equation 6 is used, it is possible to estimate the delay time while performing correction on the gains.

Furthermore, since the frequency bands of the microphone signals and the speaker signals are limited or split, it is possible to reduce the amount of calculation.

An exemplary embodiment provides an echo cancellation apparatus connectable to a speaker configured to output speaker signals and a microphone configured to receive a sound from the speaker and including a plurality of microphone elements. The echo cancellation apparatus may include: a generating unit configured to generate a plurality of sensitivity signals having different sensitivity patterns which represent directionality of the microphone, based on a plurality of microphone signals obtained from the respective microphone signals; a delay estimating unit configured to determine a shortest delay time as an estimated delay time, the shortest delay time being a shortest one of delay times between the speaker signals and the microphone signals, the delay times being obtained from the respective sensitivity signals; and an echo suppressing unit configured to suppress echoes of the plurality of microphone signals using the estimated delay time. Therefore, it is possible to reduce the echo regardless of the characteristic of the microphone.

In a case where a number of the plurality of microphone elements is two, a sensitivity signal c obtained from the microphone signals may be expressed as an equation as follows: $c = k1 \cdot c1 + k2 \cdot c2$, where c1 and c2 denote the sensitivity signals obtained from the respective microphone signals, and k1 and k2 denote arbitrary real numbers.

In a case where the shortest delay time is larger than a first predetermined time, a time obtained by subtracting the first predetermined time from the shortest delay time may be determined as the estimated delay time of the speaker signals, and in a case where the shortest delay time is smaller than the first predetermined time, the shortest delay time may be determined as the estimated delay time of the speaker signals. Therefore, even if there is a change such as movement of the microphone during use, it is possible to certainly reduce echoes.

In a case where there is a change in the delay time, if a changed time is smaller than a second predetermined time, an estimated delay time before the change may be determined as the estimated delay time of the speaker signals. Therefore, it is possible to reduce echoes generated by the change in the delay time of the speaker signals.

The echo cancellation apparatus may further include a frequency-band limiting unit configured to limit frequency bands of the microphone signals and the speaker signals. In this case, the microphone signals and the speaker signals band-limited and down-sampled by the frequency-band limiting unit may be transmitted to the delay estimating unit. If the frequency bands are limited in that way, the amount of data to be calculated is reduced. Therefore, it is possible to reduce the amount of calculation.

The echo cancellation apparatus may further include a frequency-band splitting unit configured to split the microphone signals and the speaker signals into a plurality of frequency bands, and configured to down-sample the microphone signals and the speaker signals of the frequency bands. In this case, the delay estimating unit may estimate a delay time between the microphone signals and the speaker signals for each of the frequency bands, and determine the shortest delay time of the delay times estimated for the respective frequency bands, as the estimated delay time. The frequency bands are split in that way, whereby the amount of data to be calculated is reduced. Therefore, it is possible to reduce the amount of calculation.

The echo cancellation apparatus may further include: a frequency-band splitting unit configured to split the microphone signals and the speaker signals into a plurality of frequency bands, and configured to down-sample the microphone signals and the speaker signals of the frequency bands; a power calculating unit configured to calculate power of the speaker signals for each of the frequency bands; and a determining unit configured to determine at least one of the frequency bands to be used, based on the power for each of the frequency bands. In this case, the microphone signals and the speaker signals of the frequency band determined by the determining unit may be transmitted to the delay estimating unit. The frequency band is split in that way, and a frequency band to be used is limited, whereby the amount of data to be calculated is reduced. Therefore, it is possible to reduce the amount of calculation.

An exemplified embodiment provides an echo cancellation method for an echo cancellation apparatus connectable to a speaker configured to output speaker signals and a microphone configured to receive a sound from the speaker and including a plurality of microphone elements. The echo cancellation method may include: generating a plurality of sensitivity signals having different sensitivity patterns which represent the directionality of the microphone, based on a plurality of microphone signals obtained from the respective microphone signals; determining a shortest delay time as an estimated delay time, the shortest delay time being a shortest one of delay times between the speaker signals and the microphone signals, the delay times being obtained from the respective sensitivity signals; and suppressing echoes of the plurality of microphone signals using the estimated delay time. Therefore, it is possible to reduce echoes regardless of the characteristic of the microphone.

An exemplified embodiment provides a conferencing system. The conferencing system may include: a speaker configured to output speaker signals; a microphone configured to receive a sound from the speaker and including a plurality of microphone elements; and an echo cancellation apparatus connected to the speaker and the microphone. The echo cancellation apparatus may include: a generating unit configured to generate a plurality of sensitivity signals having different sensitivity patterns which represent directionality of the microphone, based on a plurality of microphone signals obtained from the respective microphone signals; a delay estimating unit configured to determine a shortest delay time as an estimated delay time, the shortest delay time being a shortest one of delay times between the speaker signals and the microphone signals, the delay times being obtained from the respective sensitivity signals; and an echo suppressing unit configured to suppress echoes of the plurality of microphone signals using the delay time. Therefore, it is possible to reduce echoes regardless of the characteristic of the microphone.

This application claims the benefit of Japanese Patent Application No. 2011452529 filed on Jul. 11, 2011 and Japanese Patent Application No, 2012-079156 filed on Mar. 30, 2012, the contents of which are incorporated herein by reference.

What is claimed is:

1. An echo cancellation apparatus connectable to a speaker configured to output speaker signals and a microphone configured to receive a sound from the speaker and comprising a plurality of microphone elements, said echo cancellation apparatus comprising:
   a correlation calculation circuit configured to generate a plurality of sensitivity signals corresponding to a plurality of microphone signals obtained from the respective microphone elements, each of the sensitivity signals representing how much a microphone signal is correlated with a signal obtained by shifting a speaker signal by a delay time;
   a delay estimating unit configured to determine a shortest delay time as an estimated delay time, the shortest delay time being a shortest one of the delay times corresponding to peaks of the sensitivity signals; and
   an echo suppressing unit configured to suppress echoes of the plurality of microphone signals using the estimated delay time.

2. The echo cancellation apparatus according to claim 1, wherein in a case where a number of the plurality of microphone elements is two, a sensitivity signal c obtained from the microphone signals is expressed as an equation as follows:

$$c = k1 \cdot c1 + k2 \cdot c2$$

where c1 and c2 denote the sensitivity signals obtained from the respective microphone signals, and k1 and k2 denote arbitrary real numbers.

3. The echo cancellation apparatus according to claim 1, wherein in a case where the shortest delay time is larger than a first predetermined time, a time obtained by subtracting the first predetermined time from the shortest delay time is determined as the estimated delay time of the speaker signals, and
wherein in a case where the shortest delay time is smaller than the first predetermined time, the shortest delay time is determined as the estimated delay time of the speaker signals.

4. The echo cancellation apparatus according to claim 1, wherein in a case where there is a change in the delay time, if a changed time is smaller than a second predetermined time, an estimated delay time before the change is determined as the estimated delay time of the speaker signals.

5. The echo cancellation apparatus according to claim 1, further comprising:
a frequency-band limiting unit configured to limit frequency bands of the microphone signals and the speaker signals,
wherein the microphone signals and the speaker signals band-limited and down-sampled by the frequency-band limiting unit are transmitted to the delay estimating unit.

6. The echo cancellation apparatus according to claim 1, further comprising:
a frequency-band splitting unit configured to split the microphone signals and the speaker signals into a plurality of frequency bands, and configured to down-sample the microphone signals and the speaker signals of the frequency bands,
wherein the delay estimating unit estimates a delay time between the microphone signals and the speaker signals for each of the frequency bands, and determines the shortest delay time of the delay times estimated for the respective frequency bands, as the estimated delay time.

7. The echo cancellation apparatus according to claim 1, further comprising:
a frequency-band splitting unit configured to split the microphone signals and the speaker signals into a plurality of frequency bands, and configured to down-sample the microphone signals and the speaker signals of the frequency bands;
a power calculating unit configured to calculate power of the speaker signals for each of the frequency bands; and
a determining unit configured to determine at least one of the frequency bands to be used, based on the power for each of the frequency bands,
wherein the microphone signals and the speaker signals of the frequency band determined by the determining unit are transmitted to the delay estimating unit.

8. An echo cancellation method for an echo cancellation apparatus connectable to a speaker configured to output speaker signals and a microphone configured to receive a sound from the speaker and comprising a plurality of microphone elements, said echo cancellation method comprising:
generating a plurality of sensitivity signals corresponding to a plurality of microphone signals obtained from the respective microphone elements, each of the sensitivity signals representing how much a microphone signal is correlated with a signal obtained by shifting a speaker signal by a delay time;
determining a shortest delay time as an estimated delay time, the shortest delay time being a shortest one of the delay times corresponding to peaks of the sensitivity signals; and
suppressing echoes of the plurality of microphone signals using the estimated delay time.

9. The echo cancellation method according to claim 8, wherein in a case where a number of the plurality of microphone elements is two, a sensitivity signal c obtained from the microphone signals is expressed as an equation as follows:

$$c = k1 \cdot c1 + k2 \cdot c2$$

where c1 and c2 denote the sensitivity signals obtained from the respective microphone signals, and k1 and k2 denote arbitrary real numbers.

10. The echo cancellation method according to claim 8, wherein in a case where the shortest delay time is larger than a first predetermined time, a time obtained by subtracting the first predetermined time from the shortest delay time is determined as the estimated delay time of the speaker signals, and
wherein in a case where the shortest delay time is smaller than the first predetermined time, the shortest delay time is determined as the estimated delay time of the speaker signals.

11. The echo cancellation method according to claim 8, wherein in a case where there is a change in the delay time, if a changed time is smaller than a second predetermined time, an estimated delay time before the change is determined as the estimated delay time of the speaker signals.

12. A teleconferencing system comprising:
a speaker configured to output speaker signals;
a microphone configured to receive a sound from the speaker and comprising a plurality of microphone elements; and
an echo cancellation apparatus connected to the speaker and the microphone,
wherein the echo cancellation apparatus comprising:
a correlation calculation circuit configured to generate a plurality of sensitivity signals corresponding to a plurality of microphone signals obtained from the respective microphone elements, each of the sensitivity signals representing how much a microphone signal is correlated with a signal obtained by shifting a speaker signal by a delay time;
a delay estimating unit configured to determine a shortest delay time as an estimated delay time, the shortest delay time being a shortest one of the delay times corresponding to peaks of the sensitivity signals; and
an echo suppressing unit configured to suppress echoes of the plurality of microphone signals using the estimated delay time.

13. The teleconferencing system according to claim 12, wherein in a case where a number of the plurality of microphone elements is two, a sensitivity signal c obtained from the microphone signals is expressed as an equation as follows:

$$c = k1 \cdot c1 + k2 \cdot c2$$

where c1 and c2 denote the sensitivity signals obtained from the respective microphone signals, and k1 and k2 denote arbitrary real numbers.

14. The teleconferencing system according to claim 12, wherein in a case where the shortest delay time is larger than a first predetermined time, a time obtained by subtracting the first predetermined time from the shortest delay time is determined as the estimated delay time of the speaker signals, and
wherein in a case where the shortest delay time is smaller than the first predetermined time, the shortest delay time is determined as the estimated delay time of the speaker signals.

15. The teleconferencing system according to claim 12, wherein in a case where there is a change in the delay time, if a changed time is smaller than a second predetermined time, an estimated delay time before the change is determined as the estimated delay time of the speaker signals.

* * * * *